(12) United States Patent
Tsukidate et al.

(10) Patent No.: US 11,467,865 B2
(45) Date of Patent: Oct. 11, 2022

(54) VEHICLE CONTROL DEVICE

(71) Applicant: Hitachi Automotive Systems, Ltd., Hitachinaka (JP)

(72) Inventors: Tsunamichi Tsukidate, Tokyo (JP); Tasuku Ishigooka, Tokyo (JP); Tomohito Ebina, Ibaraki (JP); Kazuyoshi Serizawa, Ibaraki (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 420 days.

(21) Appl. No.: 16/623,243

(22) PCT Filed: Jun. 28, 2018

(86) PCT No.: PCT/JP2018/024504
§ 371 (c)(1),
(2) Date: Dec. 16, 2019

(87) PCT Pub. No.: WO2019/012996
PCT Pub. Date: Jan. 17, 2019

(65) Prior Publication Data
US 2020/0183733 A1    Jun. 11, 2020

(30) Foreign Application Priority Data
Jul. 13, 2017    (JP) .............................. JP2017-136709

(51) Int. Cl.
*G06F 9/48*       (2006.01)
*H04W 4/48*    (2018.01)
(Continued)

(52) U.S. Cl.
CPC .......... *G06F 9/4837* (2013.01); *B60R 16/023* (2013.01); *G05D 1/0055* (2013.01); *H04W 4/48* (2018.02); *G05D 2201/0213* (2013.01)

(58) Field of Classification Search
CPC .... G06F 9/4837; G06F 9/4812; G06F 9/4825; G06F 11/00; G06F 11/07; B60R 16/023;
(Continued)

(56) References Cited

U.S. PATENT DOCUMENTS 4,831,518 A  *  5/1989  Yu ......................... G06F 9/4812
                                                        370/216
5,995,745 A  * 11/1999  Yodaiken ............ G06F 9/45537
                                                        703/22
(Continued)

FOREIGN PATENT DOCUMENTS

| JP | H04-135246 A | 5/1992 |
|----|--------------|--------|
| JP | H07-84834 A  | 3/1995 |
| JP | 2002-251300 A | 9/2002 |

OTHER PUBLICATIONS

Machine translation of JP 4-135246 A (Year: 1992).*
(Continued)

*Primary Examiner* — Frederick M Brushaber
(74) *Attorney, Agent, or Firm* — Foley & Lardner LLP (57) ABSTRACT

In the present invention, when an abnormality occurs in a task, regardless of whether a critical section is being executed, timeout detection is realized by determining whether the critical section (CS) is necessary for the design in a preset task execution time and a certain period of time to distinguish between necessary interrupt disable and abnormal interrupt disable. A vehicle control device includes task execution means for causing a system to execute a task, and interrupt processing means for performing an interrupt process at the time of execution of the task. A maskable interrupt and a non-maskable interrupt that is commanded to execute after the maskable interrupt are included, the maskable interrupt is commanded to execute during an interrupt disable time, and then the non-maskable interrupt is executed.

5 Claims, 7 Drawing Sheets

(51) Int. Cl.
*B60R 16/023* (2006.01)
*G05D 1/00* (2006.01)
*B60W 50/02* (2012.01)
*F02D 45/00* (2006.01)

(58) Field of Classification Search
CPC ........ G05D 1/0055; G05D 2201/0213; H04W 4/48; B60W 50/0205; F02D 45/00
See application file for complete search history.

(56) References Cited

U.S. PATENT DOCUMENTS

| | | | | |
|---|---|---|---|---|
| 6,189,065 B1* | 2/2001 | Arndt | ................ | G06F 13/24 |
| | | | | 710/260 |
| 6,421,702 B1* | 7/2002 | Gulick | ................ | G06F 9/4843 |
| | | | | 712/225 |
| 6,704,763 B1* | 3/2004 | Gulick | ................ | G06F 9/4812 |
| | | | | 718/100 |
| 6,820,155 B1* | 11/2004 | Ito | ................ | G06F 9/4843 |
| | | | | 710/262 |
| 7,350,006 B2* | 3/2008 | Yasue | ................ | G06F 13/26 |
| | | | | 710/267 |
| 7,730,248 B2* | 6/2010 | Goss | ................ | G06F 1/3296 |
| | | | | 710/261 |
| 2002/0116670 A1 | 8/2002 | Oshima | | |
| 2004/0088704 A1* | 5/2004 | Owen | ................ | G06F 9/4887 |
| | | | | 718/100 |
| 2019/0332446 A1* | 10/2019 | Nilsen | ................ | G06F 9/524 |

OTHER PUBLICATIONS

International Search Report with English translation and Written Opinion issued in corresponding application No. PCT/JP2018/024504 dated Aug. 21, 2018.

* cited by examiner

| NAME | SETTING VALUE |
|---|---|
| MAXIMUM VALUE OF TIMER COUNTER | ○○ |
| FIRST COMPARE MATCH TIME | ○○ |
| SECOND COMPARE MATCH TIME | ○○ |

VEHICLE CONTROL DEVICE

TECHNICAL FIELD

The present invention relates a method for detecting an abnormality in an execution time of a process managed by an operating system (OS) of a vehicle control device.

BACKGROUND ART

In recent years, many vehicle control systems include ECUs that operate electronic vehicle control equipment, that is, electronic control units, and in-vehicle local area networks (LANs) that enable communication between multiple ECUs. These vehicle control systems are becoming increasingly sophisticated, distributed, and complicated in accordance with reduction in environmental loads and safety requirements. As a result, the importance of standardizing software architecture of ECUs, electronic control of safety devices, and mechanisms for ensuring their safety is increasing.

A functional safety mechanism has been introduced into a vehicle control system in accordance with electronic control of a safety device in a vehicle control device. Here, functional safety is electricity. The idea is to ensure safety by making the system transition to the safe side when a failure occurs in the electronic system. For example, in the ISO 26262 functional safety standard for automobiles, the automotive safety integrity level (ASIL), which is a safety level unique to the standard, is established, and in order to comply with the highest level ASIL D, it is required to prove to a third party that the main functions, safety devices, and monitoring devices are clearly separated in functions related to the safety of vehicle control devices.

When functional safety standard ISO26262 is applied to a general vehicle control device, it is known that various ASIL software is mixed in the vehicle control system. Therefore, in order for existing software to comply with the functional safety standard, a mechanism for preventing interference between software, and technologies for speeding up processes related to the mechanism, reducing weight, and improving reliability are necessary. There are a time protection function, a memory protection function, and a data protection function as a mechanism for preventing interaction between software constituting the system. Specifically, it is to prevent QM software with a low safety level from running out of control, disturbing the operation of software with a high safety level such as ASIL D software, and affecting the system.

PTL 1 descried below realizes, in order to provide a mechanism for detecting a failure that has occurred in real time, means in which a WDT linked to a multi-stage WDT is interlinked with the system in a stepwise and powerful manner and means in which minor failures that is recovered by interrupt is dealt with interrupting, moderate failures that can only be recovered by non-maskable interrupts is dealt with non-maskable interrupt, and severe failures that cannot be recovered except by restarting is dealt with system reset.

CITATION LIST

Patent Literature

PTL 1: JP 2002-251300 A

SUMMARY OF INVENTION

Technical Problem

In a system in which operation continuity of the system is required for a certain period of time even if an abnormality occurs, a mechanism is required which stops only the process in which the abnormality has occurred, maintains the functions of the entire system, and does not stop the functions as much as possible. However, in the conventional method, a timer interrupt is used to detect an execution time abnormality (timeout), and therefore an abnormality cannot be detected when interrupt is disabled. Further, another problem is that if non-maskable interrupts (NMI) are used to solve the above-described problem, it is not possible to distinguish between critical sections (CS) necessary for design and abnormal interrupt disable.

Solution to Problem

The vehicle control according to the present invention is a vehicle control device that monitors a failure of a system, and includes task execution means for causing the system to execute a task, and interrupt processing means for performing an interrupt process when the task is executed. The vehicle control device includes a maskable interrupt and a non-maskable interrupt that is commanded to execute after the maskable interrupt. When the maskable interrupt is commanded to execute during the interrupt disable time, the non-maskable interrupt is further executed. Thus, the vehicle control device can detect an abnormality in real time and can apply an appropriate fail-safe process even if interrupt is disabled.

Advantageous Effects of Invention

According to the vehicle control device according to the present invention, when an abnormality occurs in a task, regardless of whether a critical section is being executed, timeout detection is realized by determining whether the critical section (CS) is necessary for the design in a preset task execution time and a certain period of time to distinguish between necessary interrupt disable and abnormal interrupt disable.

DESCRIPTION OF EMBODIMENTS

First Embodiment

Figure 1:
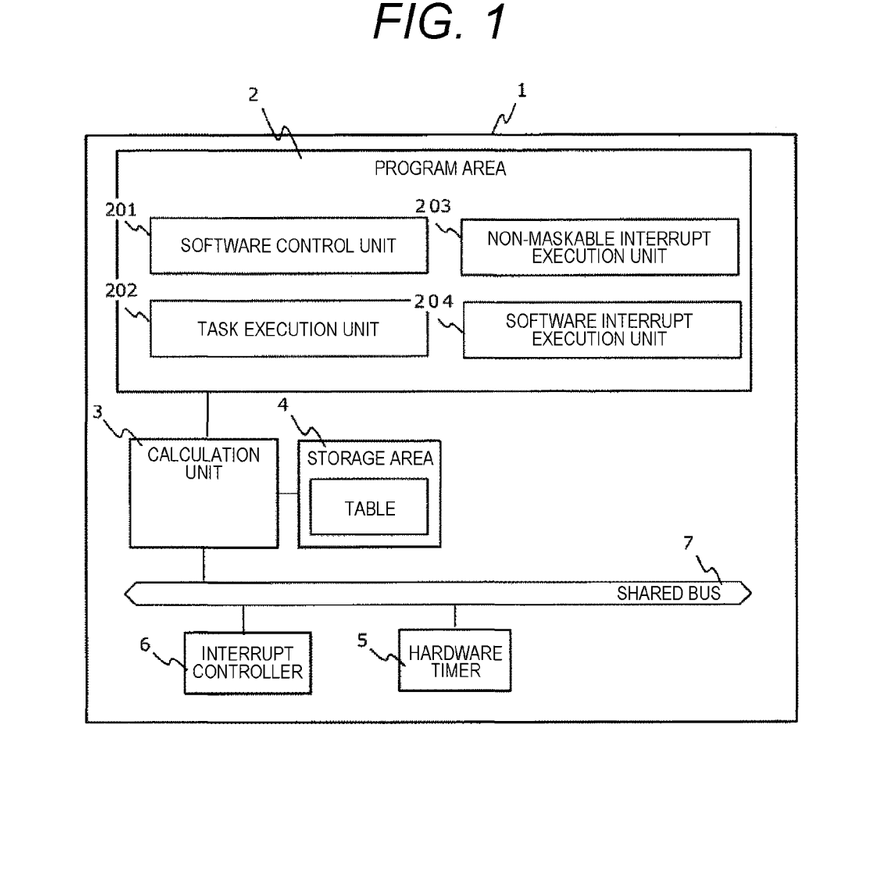
FIG. 1 is a configuration diagram of an engine control unit ECU 1 according to a first embodiment.

FIG. 1 is a configuration diagram of an engine control unit ECU 1 according to the present invention. The engine control unit ECU1 includes a program area 2, a calculation unit 3, a storage area 4, a hardware timer 5, an interrupt controller 6, and a shared bus 7.

The calculation unit 3 is a processor core (Central Processing Unit) that executes a program stored in the program area 2. The program area 2 stores a software control unit 201, a task execution unit 202, a non-maskable interrupt execution unit 203, and a software interrupt execution unit 204.

Figure 2:
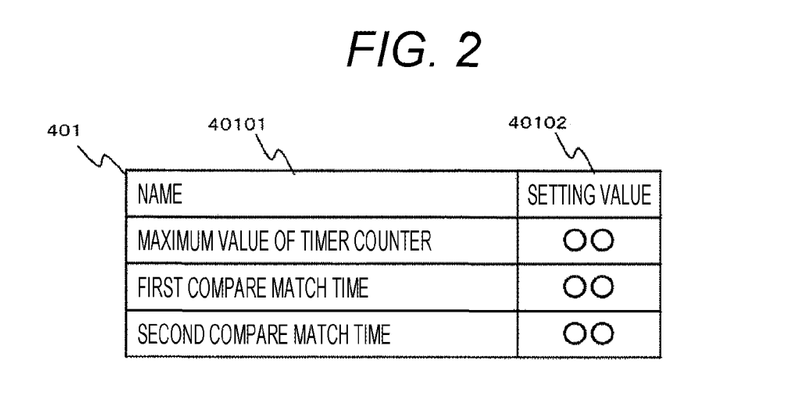
FIG. 2 is a diagram illustrating an example of a data management table 401 of the engine control unit ECU1.

The storage area 4 stores a data management table 401 described later with reference to FIG. 2 and a data recording table 402 described with reference to FIG. 3.

The hardware timer 5 counts a clock, and an elapsed time can be known from the counter value of the clock. The timer has a comparison circuit. A numerical value stored in a timer register described later with reference to FIG. 4, and a count value of the timer counter are always compared by a comparison circuit. When the two values match, a non-maskable signal is generated in the interrupt controller 6. As a result, an interrupt is generated when the set time has elapsed, and processing that requires time management can be performed. Further, the hardware timer 5 stores a timer register table 500 of FIG. 4 described later.

When the interrupt controller 6 receives the above-described non-maskable signal from the hardware timer 5, the interrupt controller 6 interrupts the process being executed by the calculation unit and generates a non-maskable interrupt (hereinafter, non-maskable interrupt).

The configuration of the engine control unit ECU 1 in the first embodiment is not limited to this. For example, a non-volatile memory (backup RAM) for storing data, a shared memory for accessing each calculation unit, a different sensor, or the like may be provided.

A table stored in the storage area 4 and the hardware timer 5 of the engine control unit ECU1 will be described below. FIG. 2 is a diagram illustrating an example of the calculation unit data management table 401 stored in the storage area 4. The data management table 401 includes a name field 40101 and a setting value field 40102. The name field 40101 is a name of an object managed by the data management table 401. In the present embodiment, the maximum value of the HW timer counter, the first compare match time, and the second compare match time are included, but the type and number of objects to be managed and the management method are not limited thereto. The setting value field 40102 represents a value in which a setting value to be managed by the data management table 401 stored.

Figure 3:
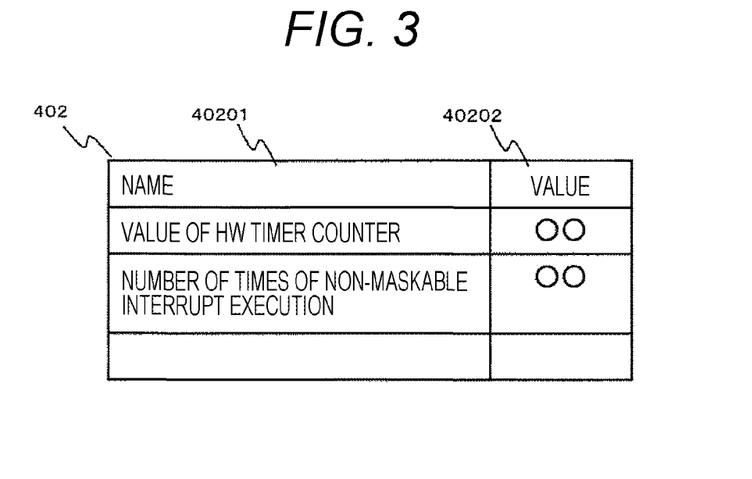
FIG. 3 is a diagram illustrating an example of a data recording table 402 of the engine control unit ECU1.

FIG. 3 is a diagram illustrating an example of the data recording table 402 stored in the storage area 4. The data recording table 402 includes a name field 40201 and a value field 40202. The name field 40201 is a name of an object managed by the data recording table 402. In the present embodiment, an HW timer counter value and the number of the non-maskable interrupt execution are included, but the types of objects to be managed, the number of objects, and the management method are not limited to this. A value field 40202 represents a value in which a value to be managed by the data recording table 402 is stored.

Figure 4:
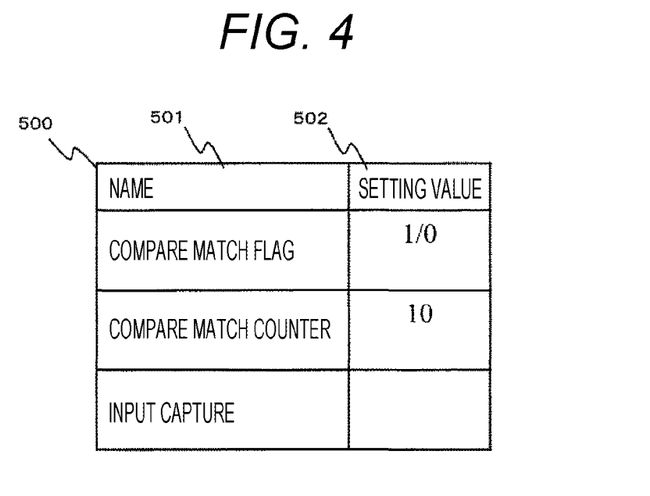
FIG. 4 is a diagram illustrating an example of a timer register table 500 of the engine control unit ECU1.

FIG. 4 is a diagram illustrating an example of the timer register table 500 stored in the hardware timer 5. The timer register table 500 includes a name field 501 and a setting value field 502. The name field 501 is a name of a target managed by the timer register table 500. In the present embodiment, a compare match flag and a compare match counter are included, but the types of objects to be managed, the number of objects, and the management method are not limited to this. The setting value field 502 represents a value in which a setting value to be managed by the timer register table 500 is stored.

The above-described table is stored in the storage area 4 and the hardware timer 5 of the engine control unit ECU 1 of the first embodiment, but the storage location of the table is not limited to this.

The operation of the hardware timer 5 of the engine control unit ECU 1 and the operation flow of the program stored in the program area 2 and executed by the calculation unit 3 will be described.

Figure 5:
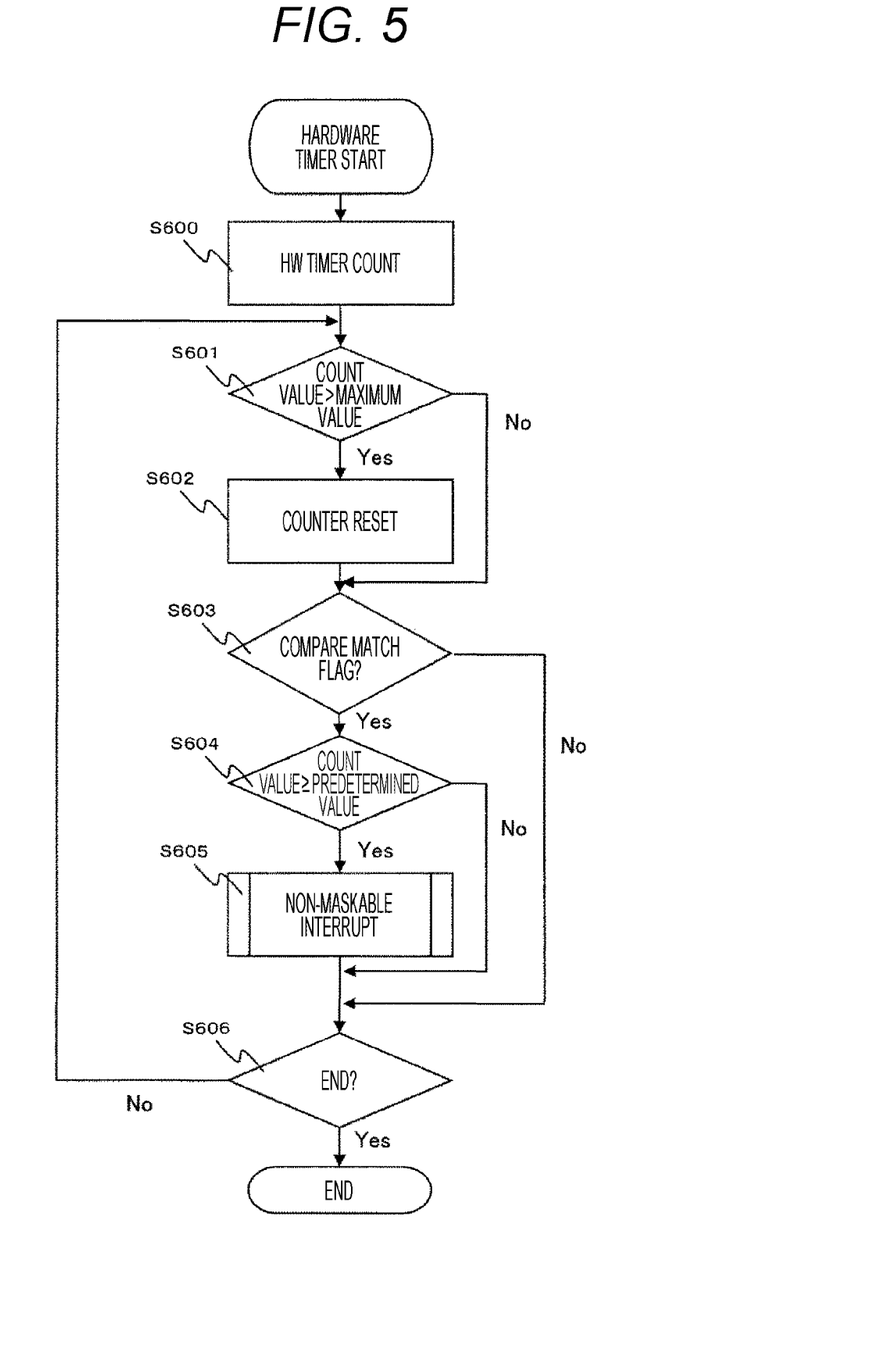
FIG. 5 is a diagram illustrating an example of an operation flow of a hardware timer 5 of the engine control unit ECU1.

FIG. 5 is an operation flow of the hardware timer 5. Hereinafter, each step of FIG. 5 will be described.

(FIG. 5: Step 600)

The hardware timer 6 5 increments and updates a hardware timer counter value.

(FIG. 5: Step 601)

The hardware timer 5 proceeds to step 602 when the hardware timer counter value reaches the maximum value, and proceeds to step 603 otherwise.

(FIG. 5: Step 602)

The hardware timer 5 resets a counter and proceeds to step 40301.

(FIG. 5: Step 603)

When the compare match flag managed by the timer register table 500 is 1, the hardware timer 5 proceeds to step 604 if values match, and proceeds to step 606 otherwise.

(FIG. 5: Step 604)

The hardware timer 5 compares the hardware timer with the compare match counter managed by the timer register table 500, and the hardware timer 5 proceeds to step 604 if they match, and proceeds to step 606 otherwise.

(FIG. 5: Step 605)

The hardware timer 5 calls a non-maskable interrupt described later, and proceeds to step 606.

(FIG. 5: Step 606)

The hardware timer 5 determines whether or not end conditions are satisfied. If the end conditions are satisfied, the hardware timer 5 ends the process, or proceeds to step 601 if not satisfied.

Figure 6:
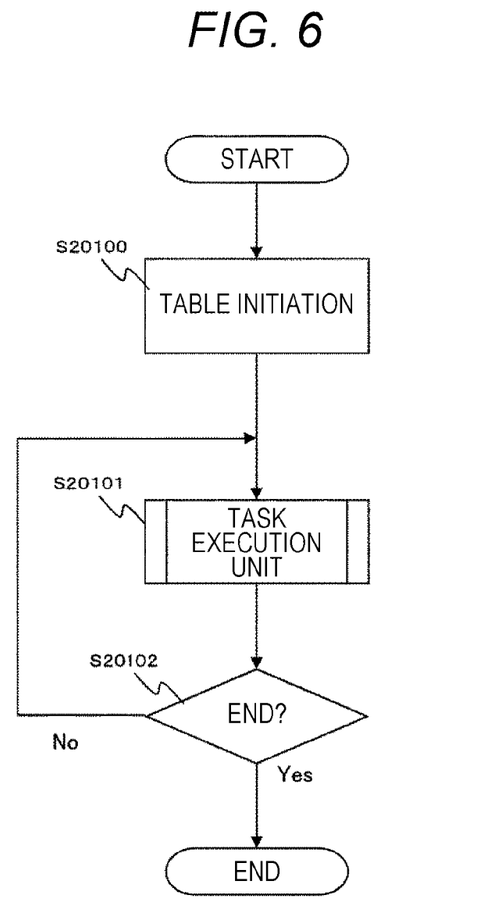
FIG. 6 is a diagram illustrating an example of an operation flow of a software control unit 201 of the engine control unit ECU1.

FIG. 6 is an operation flow of the software control unit 201. Hereinafter, each step of FIG. 6 will be described.

(FIG. 6: Step 20100)

The software control unit 201 initializes the storage area 4 and an HW timer 5, and proceeds to step 20101.

(FIG. 6: Step 20101)

The software control unit 201 calls a task execution unit described later and proceeds to step 20102.

(FIG. 6: Step 20102)

The software control unit 201 determines whether or not end conditions are satisfied, and ends the process if satisfied, or proceeds to step 20101 if not satisfied.

Figure 7:
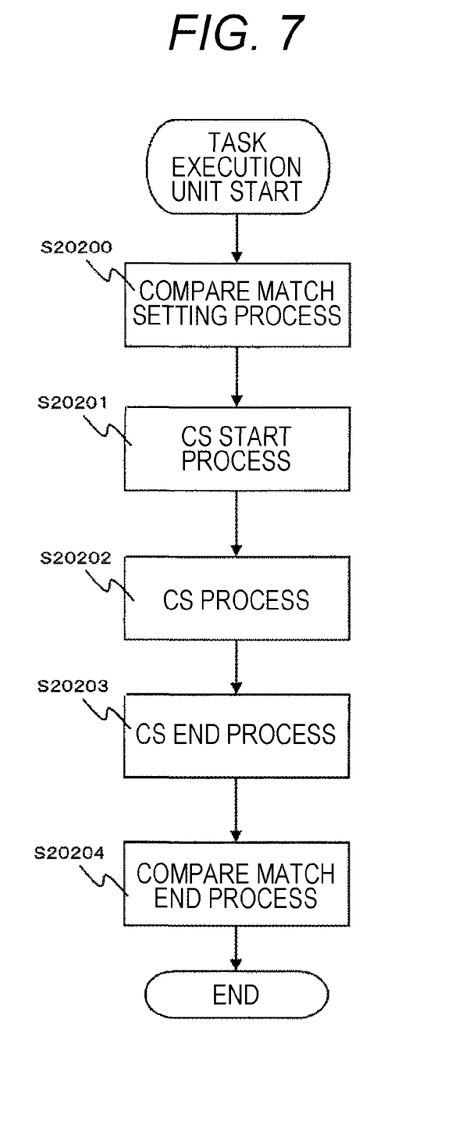
FIG. 7 is a diagram illustrating an example of an operation flow of a task execution unit 202 of the engine control unit ECU1.

FIG. 7 is an operation flow of the task execution unit 202. Hereinafter, each step of FIG. 7 will be described.

(FIG. 7. Step 20200)

The task execution unit 202 sets a compare match setting value in the timer register table 500 and proceeds to Step 20201. Here, setting of the compare match setting value refers to the process of setting the compare match flag in the timer register table 500 to 1 to set the mode to generate a compare match, and the process of acquiring the current HW timer counter from an input capture register to set the period (compare match counter) until a compare match generates.

(FIG. 7: Step 20201)

The task execution unit 202 executes the CS start process and proceeds to Step 20202. Here, the CS start process is an interrupt prohibition process for preventing the process in a critical section from being interrupted by other processes.

(FIG. 7: Step 20202)

The task execution unit 202 executes the CS process and proceeds to Step 20203.

(FIG. 7: Step 20203)

The task execution unit 202 executes a CS end process and proceeds to Step 20204. Here, the CS end process is a process for releasing an interrupt disable process and the like for preventing a critical section from being interrupted by other processes.

(FIG. 7: Step 20204)

The task execution unit 202 executes a compare match end process and ends the process. Here, the compare match end process is a process for setting the compare match flag of the timer register table 500 to 0 and turning off the compare match function.

Figure 8:
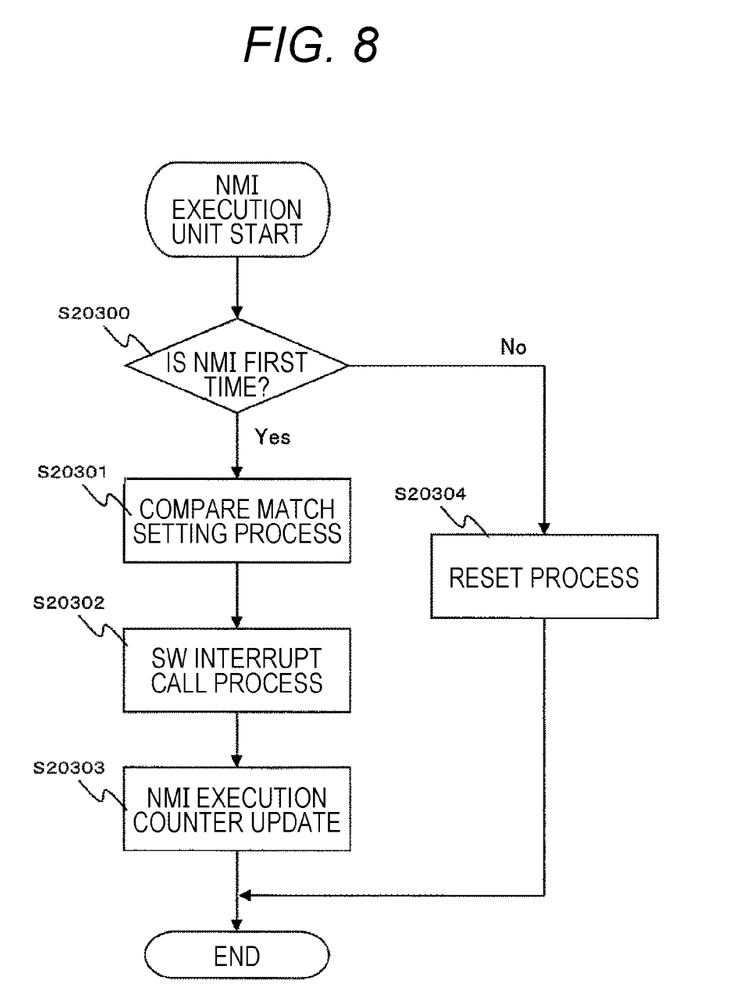
FIG. 8 is a diagram illustrating an example of an operation flow of a non-maskable interrupt execution unit 203 of the engine control unit ECU1.

(FIG. 8: Step 20300)

The NMI execution unit 203 determines the number of times of non-maskable interrupt execution in the data recording table 402. If it is the first time. The NMI execution unit 203 proceeds to step 20301, and proceeds to step 20304 otherwise.

(FIG. 8: Step 20301)

The NMI execution unit 203 executes a compare match setting process and proceeds to step 20302. Here, the compare match setting process refers to a process of acquiring a second compare match time from the data management table 401 and setting it in the compare match counter of the timer register table 500.

(FIG. 8: Step 20302)

The NMI execution unit 203 executes an SW interrupt call process and proceeds to Step 20303. Here, the SW interrupt process is an interrupt generation process for calling a software interrupt execution unit of FIG. 9 described later.

(FIG. 8: Step 20303)

The NMI execution unit 203 executes an NMI execution counter update process and ends the process. Here, the NMI execution counter update process refers to a process of incrementing the number of times of non-maskable interrupt execution in the data recording table 402.

(FIG. 8: Step 20304)

The NMI execution unit 203 executes a reset process and ends the process.

Figure 9:
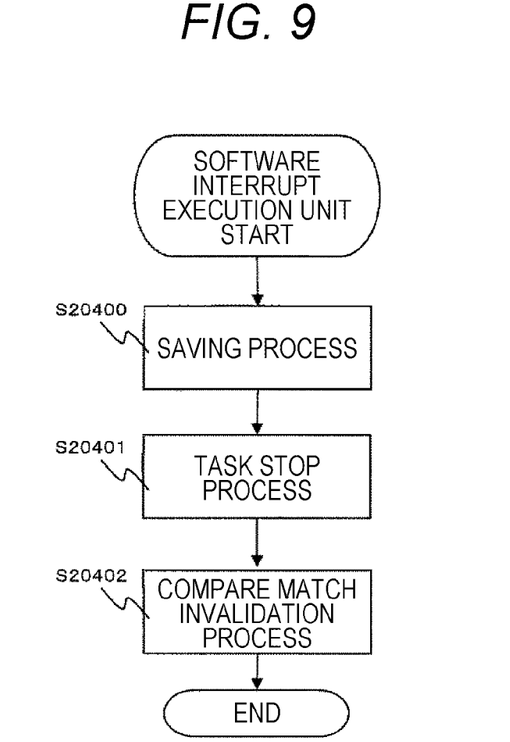
FIG. 9 is a diagram illustrating an example of an operation flow of a software interrupt execution unit 204 of the engine control unit ECU1.

(FIG. 9: Step 20300)

The software interrupt execution unit 204 executes a saving process and proceeds to step 20401. Here, the saving process refers to a process of storing a register value, a program counter value, and an HW timer counter value of the currently executing process in the storage area 4, but is not limited thereto.

(FIG. 9: Step 20301)

The software interrupt execution unit 204 executes task stop process and proceeds to step 20401. The task stop process is a process for stopping a task in which an abnormality is detected by a compare match.

(FIG. 9: Step 20302)

The software interrupt execution unit 204 executes a compare match end process and ends the process. The compare match end process is a process of setting the compare match flag of the timer register table 500 to 0 and turning off the compare match function.

As described above, according to the first embodiment, when an abnormality occurs in a task, regardless of whether a critical section is being executed, timeout detection is realized by determining whether the critical section (CS) is necessary for the design in a preset task execution time and a certain period of time to distinguish between necessary interrupt disable and abnormal interrupt disable.

The present embodiment can express the following configuration.

A vehicle control device includes task execution means for causing a system to execute a task, and interrupt processing means for performing an interrupt process at the time of execution of the task. A maskable interrupt and a non-maskable interrupt that is commanded to execute after the maskable interrupt are included, the maskable interrupt is commanded to execute during an interrupt disable time, and then the non-maskable interrupt is executed.

The non-maskable interrupt is executed when the maskable interrupt cannot be executed.

The interrupt processing means performs the interrupt processing when monitoring a failure of the system.

Task execution means for executing a task, and interrupt processing means for performing an interrupt process at the time of execution of the task are provided. The interrupt processing means includes a first non-maskable interrupt, a maskable interrupt that is commanded to execute after a predetermined time from the first non-maskable interrupt, and a second non-maskable interrupt that is commanded to execute after the maskable interrupt that is after a predetermined time from the first non-maskable interrupt. The interrupt processing means includes a case where the first non-maskable interrupt is commanded to execute during an interrupt disable time, and the maskable interrupt is executed after the interrupt disable time is released, and a case where the first non-maskable interrupt and the maskable interrupt are commanded to execute during the interrupt disable time, and then the second non-maskable interrupt is executed.

The second non-maskable interrupt is executed when the maskable interrupt cannot be executed.

The invention claimed is:

1. A vehicle control device, comprising:
   an interrupt processor configured to perform an interrupt process at a time of execution of a task,
   wherein the interrupt processor includes a first non-maskable interrupt, a maskable interrupt that is commanded to execute after a predetermined time from the first non-maskable interrupt, and a second non-maskable interrupt that is commanded to execute after the maskable interrupt that is after a predetermined time from the first non-maskable interrupt, and includes a case where the first non-maskable interrupt is commanded to execute during an interrupt disable time, and the maskable interrupt is executed after the interrupt disable time is released, and
   wherein the interrupt processor is configured to command the first non-maskable interrupt and the maskable interrupt to execute during the interrupt disable time, and to cause the second non-maskable interrupt to be executed.

2. The vehicle control device according to claim 1, wherein the non-maskable interrupt is executed when the maskable interrupt cannot be executed.

3. The vehicle control device according to claim 1, wherein the interrupt processor is further configured to perform the interrupt process when a failure of a system, for which the task is executed, is monitored.

4. A vehicle control device, comprising:
- an interrupt processor configured to perform an interrupt process at a time of execution of a task,
- wherein the interrupt processor includes a first non-maskable interrupt, a maskable interrupt that is commanded to execute after a predetermined time from the first non-maskable interrupt, and a second non-maskable interrupt that is commanded to execute after the maskable interrupt that is after a predetermined time from the first non-maskable interrupt, and includes a case where the first non-maskable interrupt is commanded to execute during an interrupt disable time, and the maskable interrupt is executed after the interrupt disable time is released, and
- the interrupt processor is configured to command the first non-maskable interrupt and the maskable interrupt to execute during the interrupt disable time, and to cause the second non-maskable interrupt to be executed.

5. The vehicle control device according to claim 4, wherein the second non-maskable interrupt is executed when maskable interrupt cannot be executed.

* * * * *